March 31, 1942. R. HOUSTON 2,277,701
COMPOSITE WOODEN FLUME
Filed May 29, 1939 3 Sheets-Sheet 1
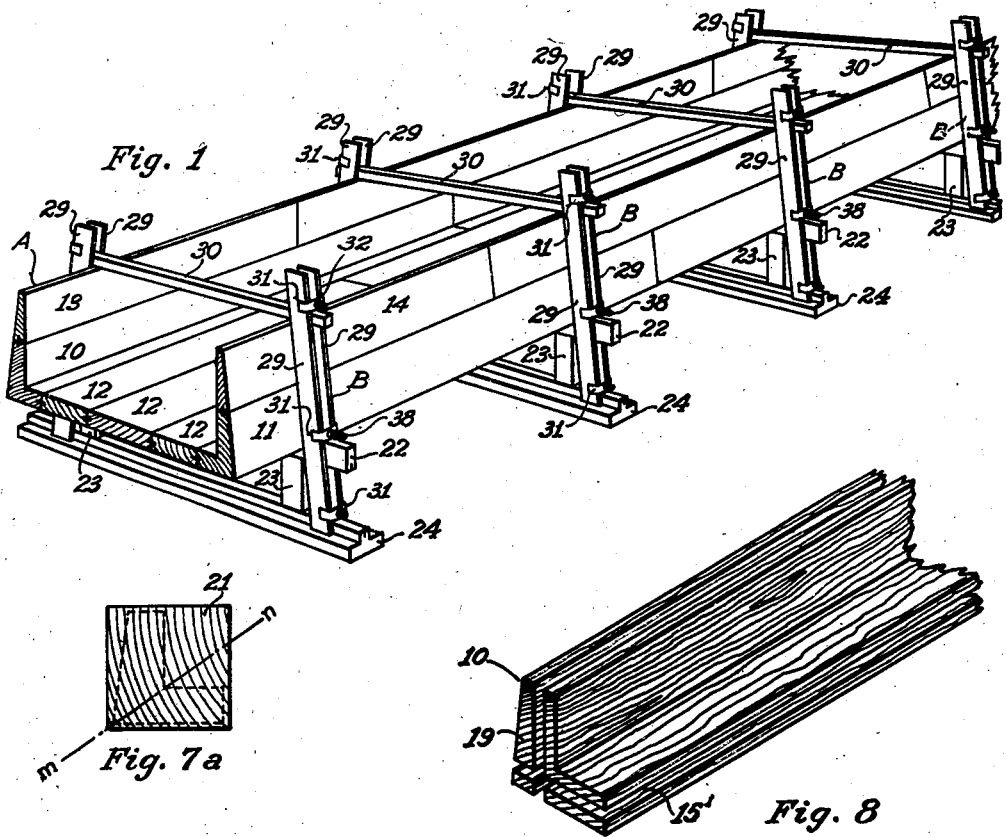
Inventor
Ross Houston
By T. J. Geisler
and T. A. Geisler
Attorneys

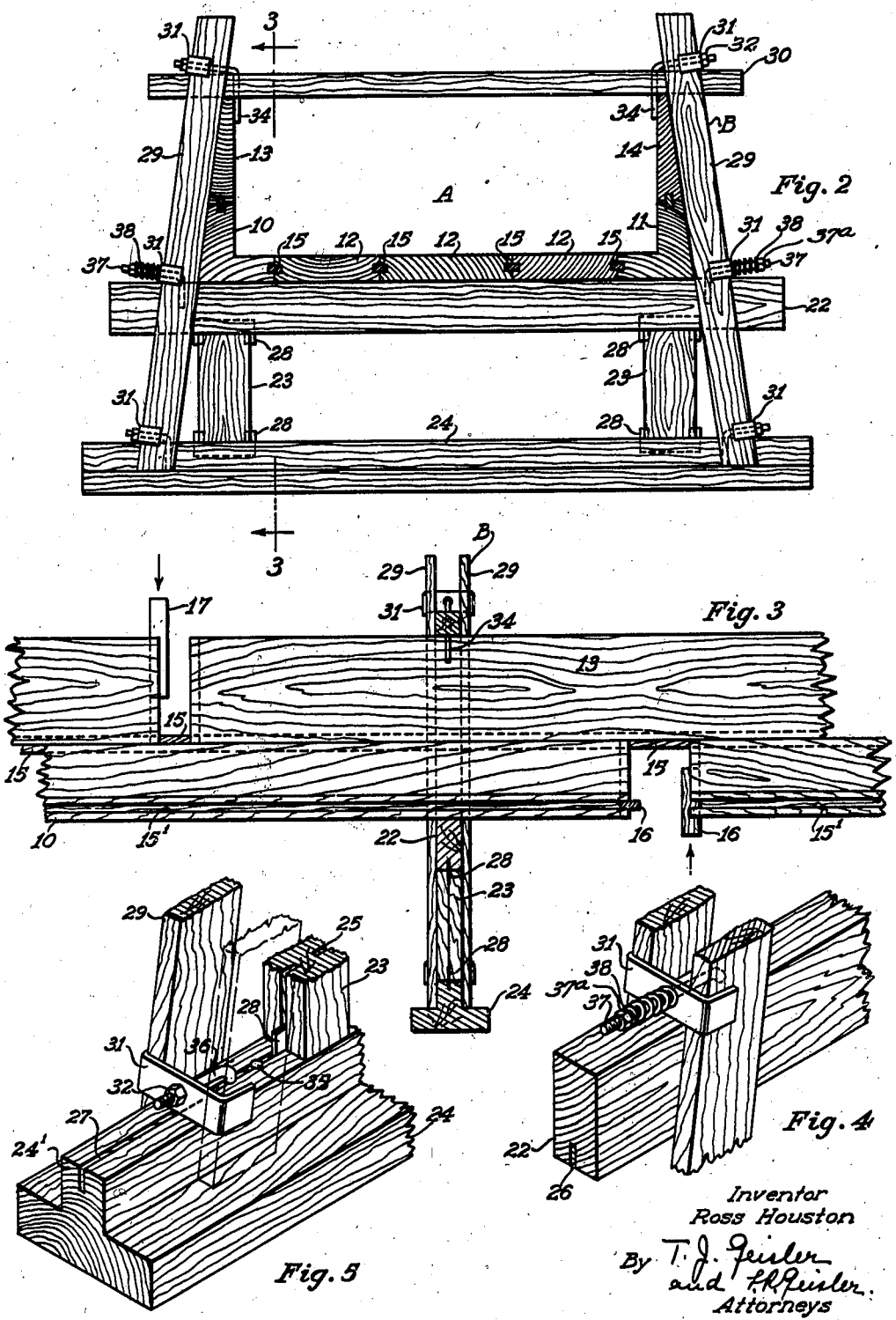

March 31, 1942.  R. HOUSTON  2,277,701
COMPOSITE WOODEN FLUME
Filed May 29, 1939  3 Sheets-Sheet 3

Inventor
Ross Houston
By T. J. Geisler
and T. N. Geisler
Attorneys

Patented Mar. 31, 1942

2,277,701

UNITED STATES PATENT OFFICE 2,277,701

COMPOSITE WOODEN FLUME

Ross Houston, Tacoma, Wash.

Application May 29, 1939, Serial No. 276,406

11 Claims. (Cl. 61—14)

This invention relates to wooden flumes, such as those used commonly for conveying water for use in mills, for ore washing or other mining operations, and particularly for conveying water for irrigation purposes.

Ordinary wooden flumes which have been used for these purposes for many years have never proved entirely satisfactory, owing to the difficulty of keeping such flumes in repair, of preventing the boards from separating or warping, and especially the difficulty of preventing the opening up of cracks due to the expansion and shrinkage of the lumber. Where the sides and bottom of the flume join together, it has been particularly troublesome to prevent the opening up of the crack between the respective side and bottom members. Also considerable difficulty is involved in making a wooden flume, built in the customary manner, sufficiently strong and rigid to withstand heavy winds, storms and other pressures and strains to which such flumes may be subjected.

The object of my invention is to provide a wooden flume composed of unit pieces which can readily be set up wherever the flume is desired and put together so as to form a strong rigid construction, and without requiring the usual nailing of the individual boards or pieces in place.

A further object of my invention is to provide a strong composite wooden flume in which the individual members or boards will be held firmly together, regardless of any shrinkage or expansion of the lumber, and to this end to provide adequate means for compensating for such shrinkage or expansion as may occur, and, furthermore, to keep the members or boards constantly clamped together under all conditions and strains.

Another object of my invention is to provide a flume of the character described in which the customary joint between the side and bottom members will be entirely dispensed with by using single L-shaped wooden members to form the bottom edges of the flume.

A further particular object is to cut such L-shaped members, referred to in the preceding paragraph, in a special way so as to avoid any tendency of these members to crack or split as the lumber becomes old, or in the event the lumber is permitted to dry out, and thus to prevent the forming of any leaky cracks at the bottom edges of the flume.

These and other objects, and incidental features of my invention, I attain by the construction and arrangement of parts hereinafter described with reference to the accompanying drawings.

In the drawings:

Fig. 1 is a perspective view of a portion of a flume constructed in accordance with the principles of my invention;

Fig. 2 is a typical transverse sectional elevation;

Fig. 3 is a fragmentary longitudinal sectional elevation taken on line 3—3 of Fig. 2, with some of the members separated to show the manner in which splines are inserted to secure adjacent edges together;

Fig. 4 is an isometric detail view showing the resilient connection between certain members of the flume-supporting structure;

Fig. 5 is a similar detail view illustrating certain other important connections in my flume-supporting structure hereinafter described;

Fig. 6 is an end elevation of a log showing the position, with respect to the annual rings thereof, of four pieces of timber or lumber which are to be cut from this log to produce the required corner members of my flume;

Fig. 7 is an end view of one of these pieces of lumber indicating, by dotted line, the correct position in which these corner members are to be sawed so that these corner members will have the proper grain, assuring best results;

Fig. 7a is a comparative view showing a similar piece of lumber but with the corner member incorrectly positioned with respect to the grain so as to render the corner member, when so cut, not suitable for use;

Fig. 8 is a fragmentary isometric view of one of the corner or L-shaped members properly fabricated from a suitable piece of lumber as illustrated by Fig. 7;

Figure 10:
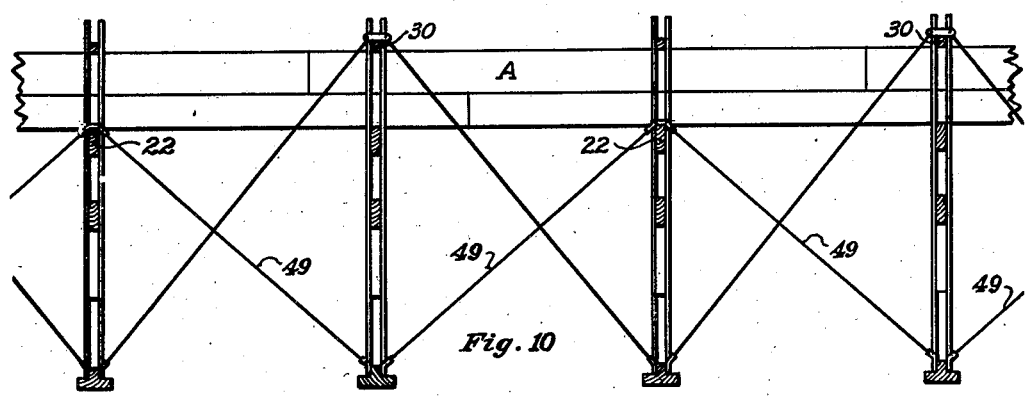
Fig. 10 is a schematic side elevation illustrating an efficient method of bracing the supporting elements longitudinally of the flume.

Referring first to Fig. 1, the assembled flume comprises a continuous trough A, supported at the proper gradient, to give the required gravitational flow by uniformly spaced transverse towers or "bents" B which extend from the ground to the necessary height.

The trough A is made up of a pair of L-shaped wooden corner members 10 and 11, a series of planks 12 forming the bottom of the trough, and side boards 13 and 14 superimposed on the corner or L-shaped members 10 and 11. The capacity of the trough can, of course, be varied by the widths and numbers of the bottom planks 12 and the height of the side boards 13 together with corresponding variation in size of the corner members 10 and 11. The longitudinal joints of these component parts of the wooden flume are rendered water-tight by previously providing their edges with grooves 15′ (Fig. 3) for receiving splines 15 which are preferably made of hardwood and are pressed into the grooves during assembly in the conventional manner (see Fig. 2). The lateral joints of adjacent bottom and corner members are staggered as shown in Figs. 1 and 3, and are sealed by short splines 16 inserted in the grooved ends of said members or other connecting and sealing means. When the side boards 13 and 14 are relatively thin, metal strips 17 (Fig. 3) may be used instead of wooden splines. Thus each part of the trough portion is removably joined to the adjacent parts so that when clamped tightly together in the supporting structure a water-tight duct is obtained.

It is very important that the wooden members of the trough portion, particularly the L-shaped corner members 10 and 11, do not develop cracks due to the shrinkage or expansion of the wood of which they are fabricated; the shrinkage being unavoidably caused by the natural drying out of the wood and the expansion by the absorption of the water carried in the flume. The bottom boards 12 are held always contiguous in water-tight relation in spite of this unavoidable lateral expansion and contraction by novel means incorporated in the supporting structure of my flume.

The construction and arrangement of these supporting means are shown in Figs. 1 and 2. The L-shaped corner members 10 and 11, and the intervening bottom planks 12, rest directly on transverse horizontal saddle members 22, which in turn are supported at each end on struts 23 interposed between the saddle members 22 and T-shaped wooden ground sills 24. The struts 23, which are cut to the proper lengths to support the saddles 22 and trough at the desired height and gradient, have grooves 25 machined in their edges (see Fig. 5). The bottom face of each saddle member 22 is provided with a similar narrow continuous groove 26 (see Fig. 4), and the uppermost face of the ground sills 24 is also provided with such a continuous groove 27 (see Fig. 5). When the sills, struts and saddles are to be assembled, U-shaped metal plates 28 are placed in the grooves of the sills and saddles and the struts 23 are then inserted between them as shown in Fig. 2 so that the legs of the U-shaped plates 28 can be pressed into the side grooves in the struts. These plates 28 thus prevent the struts from slipping off the sills 24, or from being pushed out from under the saddles 22, and dispense with the necessity of using nails, screws or bolts to hold the struts in place. One of the important features of my invention is the avoidance of the use of nails, screws and bolts for fastening the various members together.

Instead of bolting or nailing the trough members to the supporting members, I clamp them firmly between pairs of side cleats 29, 29, in the manner illustrated in Figs. 1 and 2. The cleats of each pair are arranged with one on each side of the saddle member 22 and one on each side of a transverse horizontal tie 30 which bears on the upper edges of the upper side boards 13 and 14. The bottom ends of the cleats 29 rest on the ground sills 24 on each side of the center rib 24′ as shown also in Figs. 3 and 5. Metal clips 31 hold the cleats 29 against the sides of the cross ties 30, saddles 22 and the center rib 24′ of the ground sills 24, each of these members being provided with suitable holes to receive the depending shanks of hook bolts 34 which are passed through the clips 31. On the outer ends of these hook bolts are threaded nuts 32. The holes in the tie bars 30 for the hook bolts extend entirely through the tie bars, so that the downwardly extending shank of these hook bolts 34 will grip the upper portions of the side boards 13 and 14 of the trough and hold them firmly against the cleats 29 as shown in Fig. 2.

Holes 35 (see Fig. 5) are provided in the top of the center rib of the ground sills 24 for the depending shanks of the hook bolts 36, which hold the bottom ends of the cleats 29 in place, a series of such holes being provided, if desired, to permit adjustment of the bottom ends of the cleats. The intermediary hook bolts 37 (see Figs. 2 and 4) similarly have their depending shanks inserted in holes provided in the top face of the saddle members 22, and the threaded ends of these bolts are extended to receive compression springs 38 interposed between the nuts 37a and the clips.

The springs 38 carried by bolts 37 serve to permit the cleats 29, which are rigidly secured at top and bottom, to be bent outwardly in the intervening span under sufficient outward pressure. The compression springs 38, however, at the same time constantly hold the cleats 29 against the trough sides. In other words, the provision, for permitting the outward bending of the cleats under pressure, provides accommodation for the lateral expansion and contraction of the members of the trough, at the same time assures that the trough members will be constantly held pressed firmly in place in substantial water-tight relation.

The slope of the cleats 29 is made to correspond to that of the outer face of the walls of the trough, in order to obtain a stronger and more stable structure, inasmuch as the bases of the cleats are spread a substantial distance further apart than their top extremities as shown in Fig. 2.

Referring now to the fabrication of the L-shaped corner members 10 and 11, I have discovered that these must be cut in a certain relation with respect to the grain of the wood in order to neutralize any tendency of the wood to split. A log C, as shown in Fig. 6, when exposed to varying temperatures and variations in humidity, will develop some cracks or checks, such as those indicated at 18 in Fig. 6. These checks invariably radiate from the center or heart of a log and follow the courses of the medullary rays of the tree from the heart out. Thus, as I have observed, the tendency of the log is to check along radial lines or in lines which are substantially perpendicular to lines tangent to the annual grain rings 19 of a log; and any tendency of lumber or timbers to split follows the same lines. Therefore, when making the L-shaped corner members 10 and 11 from timbers or prisms of wood, such as those indicated by 20 in Fig. 6, I found that if the cuts were so made that the grain of the L-shaped timber would run as illustrated in Fig. 7, splitting of such member across the corners would not occur, but that if such member were cut with the grain running as illustrated in Fig. 7a, there would be a strong probability of checks developing across the corners. In other words, I found that when the L-shaped corner members 10, 11 for my trough are so cut that a line m—n (Fig. 7) extending transversely thru the inner and outer corners of the finished member will be substantially tangent to one of the grain arcs 21 there will be no tendency for checks or cracks to develop across the corners of such member, such tendency to crack or check existing only in the direction indicated by the directional line o—p; but when the L-shaped members are so cut that the line m—n connecting the inner and outer corners is substantially perpendicular to lines tangent to the grain arcs 21, as shown in Fig. 7a, checks and cracks which develop will tend to develop along the line m—n across the corners of the L-shaped member thus weakening the corner members and rendering them unfit for lengthy use in my flume construction. By experiments I have found, therefore, that for most efficient fabricating of these L-shaped members, the angularity between the line connecting the inner and outer corners, such as the line m—n in Figs. 7 and 7a, and the line tangent to the nearest grain arc, should not be more than 20 degrees. This method of cutting the L-shaped corner members of my flume constitutes a very important factor of my invention.

In the drawings I have shown the outer face of each side wall of the trough as sloping from the vertical, that is, these walls are tapered upwardly, the inside face being substantially vertical. The L-shaped corner members are thus shown formed with a corresponding slope on the outside face of their upwadly extending portion. This, however, is to be understood as illustrating only one mode of carrying my invention into practise.

Figure 9:
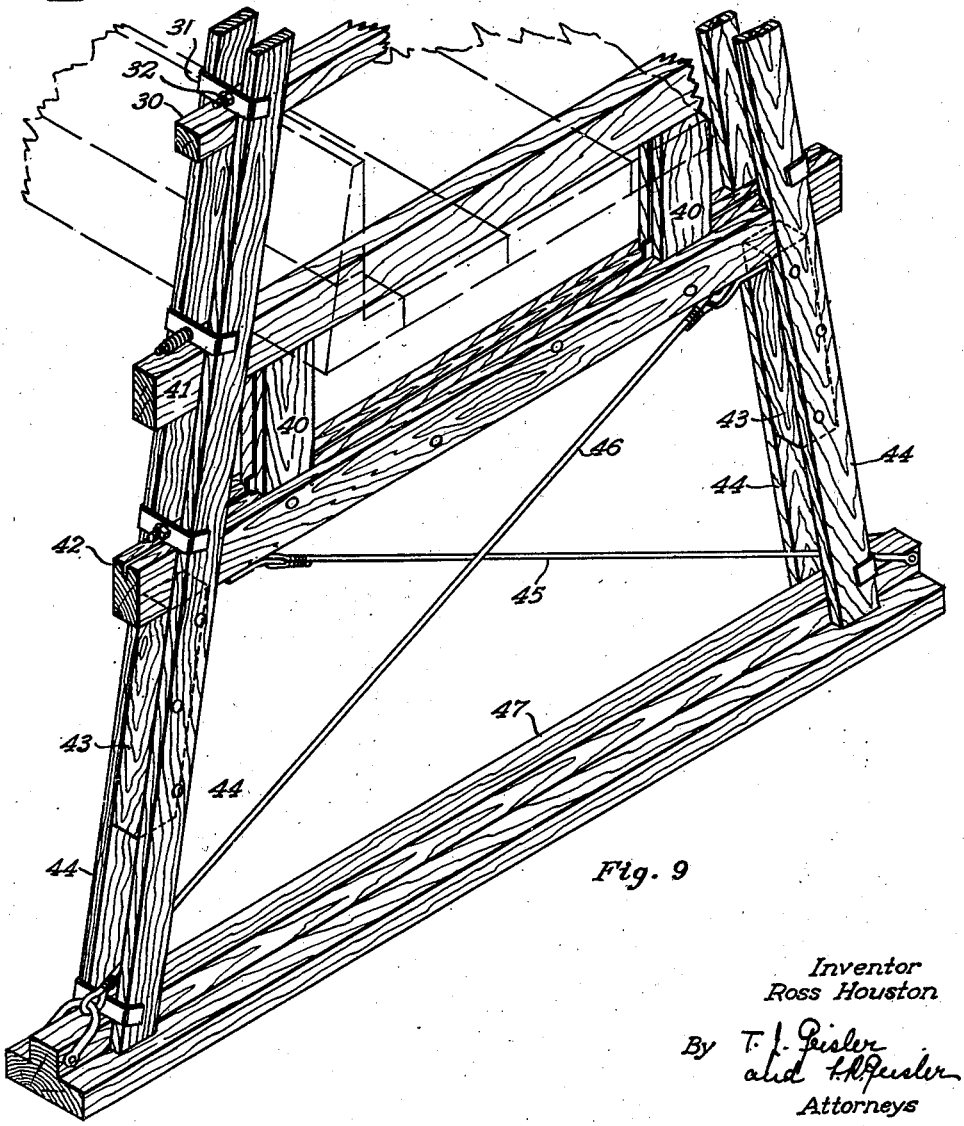
Fig. 9 is an isometric fragmentary view illustrating a method of bracing the supporting elements in my flume, with the trough shown in broken lines.

When the trough portion of the flume is to be supported at considerable distance above the ground, I have found it advisable to use the modified form of supporting towers or bents illustrated in Fig. 9. In this case, in order to render the supporting towers or bents more staple, the struts 40, which support the saddle 41 and the superimposed trough section, bear on horizontal cross-bars 42 which in turn rest on blocks 43 interposed between the binding cleats 44, these blocks being bolted or otherwise securely fastened to the cleats. The cross bars 42 are grooved to receive the strut-retaining clips previously described, and are provided with holes for suitable hook bolts. Diagonal bracing in the form of crossed wire ropes 45, 46, or the like, attached to the cross-bars 42 and the ground sills 47, by hook bolts or any other suitable means, may be added to increase the stability of these higher supporting towers or bents. Should the height of these towers also make the use of longitudinal bracing desirable, wire ropes 49 (Fig. 10), or similar tension members, may be secured to the saddle members 22 and extended diagonally at the side of the flume to connect with the ground sills of the adjacent supporting towers, or may similarly be secured to the top tie bars 30.

Obviously, many modifications might be made in the arrangement and bracing of the supporting members or various portions of the trough supports without departing from the principle of my invention. It is not my intention to restrict my flume to the use of the particular supporting means suggested, nor to limit my invention otherwise than as set forth in the attached claims.

I claim:

1. In a flume of the character described, bottom members having connecting means in their adjacent edges, L-shaped corner members constituting the bottom edges of the flume, and resilient means for clamping said members together.

2. In a flume of the character described, bottom members and side members having connecting means in their adjacent edges, and L-shaped corner members constituting the bottom edges of the flume, said corner members having a horizontal portion and a vertical portion, the inner face of said vertical portion being substantially perpendicular to the horizontal portion but the outer face of said vertical portion making an acute angle with said horizontal portion, and supporting towers, said towers including side cleats bearing against the side and corner members of the flume.

3. In a flume of the character described, bottom members, and L-shaped corner members constituting the bottom edges of the flume, said L-shaped members being so cut with respect to the annular grain rings of the wood that a line between the inner and outer corners of the finished L-shaped member will be substantially tangent to such annular grain ring, and means for clamping said bottom and said corner members together.

4. In a flume of the character described having sides and a bottom, L-shaped corner members constituting the bottom edges of the flume, said corner members having a horizontal portion and a vertical portion, said L-shaped members being so cut with respect to the annular grain rings of the wood that a line between the inner and outer corners of the finished L-shaped member will be inclined not more than 20 degrees from a line tangent to such annular grain ring.

5. In a flume of the character described, bottom members having connecting means in their adjacent edges, L-shaped corner members constituting the bottom edges of the flume, supporting towers, said towers including side cleats bearing against the outer side walls of the L-shaped corner members, means for tying said cleats together transversely of said flume, whereby to keep said bottom and said L-shaped members firmly pressed together, said second mentioned means including a resilient element to permit said cleats to bend outwardly in line with said bottom members to compensate for lateral expansion of said bottom members.

6. A flume of the character described comprising bottom members having connecting means in their adjacent edges, the end joints of said members being staggered, L-shaped corner members constituting the bottom edges of the flume, said corner members having a horizontal portion and a vertical portion, the vertical portion being tapered upwardly and inwardly, supporting towers, said towers including pairs of side cleats bearing against the outer side walls of the L-shaped corner members, and means for tying said pairs of cleats together transversely of said flume, whereby to keep said bottom and said L-shaped members firmly pressed together.

7. The combination described by claim 6 with said second mentioned means including a resilient element to permit said cleats to bend outwardly in line with said bottom members to compensate for lateral expansion of said bottom members.

8. The combination described by claim 6 including additional means for bracing said supporting towers.

9. In a flume of the character described, bottom members and side members having connecting means in their adjacent edges, the end joints of said members being staggered, L-shaped corner members constituting the bottom edges of the flume, said L-shaped members being so cut with respect to the annular grain rings of the wood that a line between the inner and outer corners of the finished L-shaped member will be substantially tangent to such annular grain ring, supporting towers, said towers including pairs of side cleats bearing against the outer side walls of the side and corner members, and means for securing said cleats in place, said second mentioned means including a resilient element to permit said cleats to bend outwardly in line with said bottom members to compensate for lateral expansion of said bottom members.

10. A wooden flume comprising a trough comprising bottom members and L-shaped corner members, supports for said trough including transversely extending saddles, struts supporting said saddles and resting on ground sills, cleats bearing against the sides of said corner members, transverse ties at the top of said trough, the tops of said cleats connected to said ties, the bottoms of said cleats connected to said ground sills, and resilient means connecting said cleats to said saddles, whereby to permit said cleats to yield at their middle to outward pressure while constantly maintaining pressure against the sides of said trough.

11. A wooden flume comprising a trough comprising bottom members and L-shaped corner members connected together, supports for said trough including transversely extending saddles, ground sills, struts between said saddles and said ground sills, means holding said struts against lateral displacement with respect to said sills and said saddles, cleats bearing against the sides of said corner members, and transverse ties at the top of said trough, the tops of said cleats being connected to said ties, the bottoms of said cleats being connected to said ground sills.

ROSS HOUSTON.